US010261597B2

(12) United States Patent
Inamoto et al.

(10) Patent No.: US 10,261,597 B2
(45) Date of Patent: Apr. 16, 2019

(54) INFORMATION PROCESSING APPARATUS, INPUT TERMINAL SELECTION METHOD, PROGRAM, AND SYSTEM

(75) Inventors: Shinji Inamoto, Tokyo (JP); Sadakazu Nagao, Tokyo (JP); Katsutoshi Ishiwata, Tokyo (JP); Daisuke Ogata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/124,955

(22) PCT Filed: Jun. 29, 2012

(86) PCT No.: PCT/JP2012/066724
§ 371 (c)(1),
(2), (4) Date: Dec. 9, 2013

(87) PCT Pub. No.: WO2013/015071
PCT Pub. Date: Jan. 31, 2013

(65) Prior Publication Data
US 2014/0111426 A1 Apr. 24, 2014

(30) Foreign Application Priority Data

Jul. 28, 2011 (JP) .................................. 2011-165146

(51) Int. Cl.
*G06F 3/038* (2013.01)
*G06F 3/02* (2006.01)
(Continued)

(52) U.S. Cl.
CPC ................ *G06F 3/02* (2013.01); *A63F 13/22* (2014.09); *A63F 13/235* (2014.09); *G06F 3/038* (2013.01);
(Continued)

(58) Field of Classification Search
CPC combination set(s) only.
See application file for complete search history.

(56) References Cited

U.S. PATENT DOCUMENTS 6,081,855 A 6/2000 deCarmo
2005/0225530 A1* 10/2005 Evans ................... G06F 3/0238
345/156

(Continued)

FOREIGN PATENT DOCUMENTS

JP 2000-330702 11/2000
JP 2007-066057 3/2007
(Continued)

OTHER PUBLICATIONS

May 3, 2015, EP communication issued for related EP application No. 12817794.6, Jun. 26, 2015.
(Continued)

*Primary Examiner* — Robert J Michaud
(74) *Attorney, Agent, or Firm* — Paratus Law Group, PLLC

(57) ABSTRACT

Provided is an information processing apparatus including an acquisition unit configured to acquire device information on a plurality of connected input terminals, and a selection unit configured to determine an importance degree of the input terminals based on information concerning detection units of the input terminals included in the device information to select the input terminal to be used depending on the importance degree.

18 Claims, 10 Drawing Sheets

(51) Int. Cl.
  *H04N 21/422* (2011.01)
  *H04N 21/442* (2011.01)
  *G08C 17/02* (2006.01)
  *H04N 21/41* (2011.01)
  *H04N 21/443* (2011.01)
  *A63F 13/22* (2014.01)
  *A63F 13/235* (2014.01)

(52) U.S. Cl.
  CPC ......... *G08C 17/02* (2013.01); *H04N 21/4126* (2013.01); *H04N 21/42204* (2013.01); *H04N 21/42222* (2013.01); *H04N 21/4436* (2013.01); *H04N 21/44222* (2013.01); *H04N 21/44231* (2013.01); *G08C 2201/20* (2013.01)

(56) References Cited

U.S. PATENT DOCUMENTS

2006/0264258 A1* 11/2006 Zalewski ................ A63F 13/00 463/36
2007/0274243 A1* 11/2007 Yamaguchi et al. .......... 370/310
2007/0291661 A1* 12/2007 Nishibayashi .......... H04L 12/66 370/252
2008/0119273 A1* 5/2008 Yamada ................ G06F 1/3215 463/39
2009/0109053 A1 4/2009 Itoh
2009/0133129 A1 5/2009 Jeong et al.
2011/0225149 A1* 9/2011 Takahashi et al. ............ 707/723
2012/0095819 A1* 4/2012 Li ............................... 705/14.23

FOREIGN PATENT DOCUMENTS

JP 2007-272405 10/2007
JP 2010-152493 7/2010

OTHER PUBLICATIONS

May 19, 2015, JP communication issued for related JP application No. 2011-165146.
Jan. 5, 2016, Japanese Office Action for related JP Application No. 2011-165146.
Dec. 21, 2016, CN communication issued for related CN application No. 201280036190.1.

* cited by examiner

FIG. 4

MANAGEMENT INFORMATION OF TILT SENSOR

| INPUT TERMINAL | PRESENCE OR ABSENCE OF DEVICE | TERMINAL TYPE | SAMPLING INTERVAL [msec] | REMAINING BATTERY LEVEL [%] | ACCURACY | CONNECTION ORDER | USAGE HISTORY [NUMBER OF TIMES] |
|---|---|---|---|---|---|---|---|
| GAME CONTROLLER | PRESENCE | CONTROLLER | 20 | 5 | 1/1000 | 2 | 210 |
| REMOTE CONTROLLER | PRESENCE | REMOTE CONTROLLER | 50 | 90 | 1/100 | 1 | 0 |
| SMART PHONE A | PRESENCE | SMART PHONE | 30 | 80 | 1/200 | 3 | 63 |
| SMART PHONE B | PRESENCE | SMART PHONE | 40 | 80 | 1/200 | 4 | 0 |

INFORMATION PROCESSING APPARATUS, INPUT TERMINAL SELECTION METHOD, PROGRAM, AND SYSTEM

CROSS REFERENCE TO PRIOR APPLICATION

This application is a National Stage Patent Application of PCT International Patent Application No. PCT/JP2012/066724 (filed on Jun. 29, 2012) under 35 U.S.C. § 371, which claims priority to Japanese Patent Application No. 2011-165146 (filed on Jul. 28, 2011), which are all hereby incorporated by reference in their entirety.

TECHNICAL FIELD

The present disclosure relates to an information processing apparatus, an input terminal selection method, a program, and a system.

BACKGROUND ART

In recent years, there have been known, for example, a keyboard, mouse, and controller as an input terminal which is easily detachable to an information processing apparatus. In a case where a plurality of such input terminals are connected to the information processing apparatus, a user selects an input terminal to use depending on a function of the input terminal. Additionally, the user selects the input terminal to use from a plurality of detachable input terminals and connects the selected input terminal with the information processing apparatus. In this way, in an input system including the information processing apparatus and plurality of input terminals, the user has selected an arbitrary input terminal depending on the intended use.

For example, an input device sharing system described in Patent Literature 1 below has a sharing mode function able to share an input device which is connected with the information processing apparatus with another information processing apparatus. This makes it possible to operate a plurality of information processing apparatuses using the input device connected with the information processing apparatus explicitly specified by a user.

CITATION LIST

Patent Literature

Patent Literature 1: JP 2000-330702A

SUMMARY OF INVENTION

Technical Problem

However, in a case where a plurality of input terminals of the same kind are connected, a proper input terminal has been difficult for the user to select.

Therefore, the present disclosure proposes a novel and enhanced information processing apparatus, information processing method, and program which are able to improve accuracy of input terminal selection.

Solution to Problem

According to the present disclosure, there is provided an information processing apparatus including an acquisition unit configured to acquire device information on a plurality of connected input terminals, and a selection unit configured to determine an importance degree of the input terminals based on information concerning detection units of the input terminals included in the device information to select the input terminal to be used depending on the importance degree.

According to the present disclosure, there is provided an input terminal selection method including a step for acquiring device information on a plurality of connected input terminals, and a step for determining an importance degree of the input terminals based on information concerning detection units of the input terminals included in the device information to select the input terminal to be used depending on the importance degree.

According to the present disclosure, there is provided a program for causing a computer to execute processes of acquiring device information on a plurality of connected input terminals, and determining an importance degree of the input terminals based on information concerning detection units of the input terminals included in the device information to select the input terminal to be used depending on the importance degree.

Effect

In this way, according to the present disclosure, accuracy of input terminal selection can be improved by selecting the input terminal based on device information acquired from a plurality of connected input terminals depending on an importance degree of the input terminal.

Advantageous Effects of Invention

As described above, according to the present disclosure, the accuracy of input terminal selection can be improved.

BRIEF DESCRIPTION OF DRAWINGS

FIG. 4 is a diagram showing an example of detection unit management information according to this embodiment.

DESCRIPTION OF EMBODIMENTS

Figure 1:
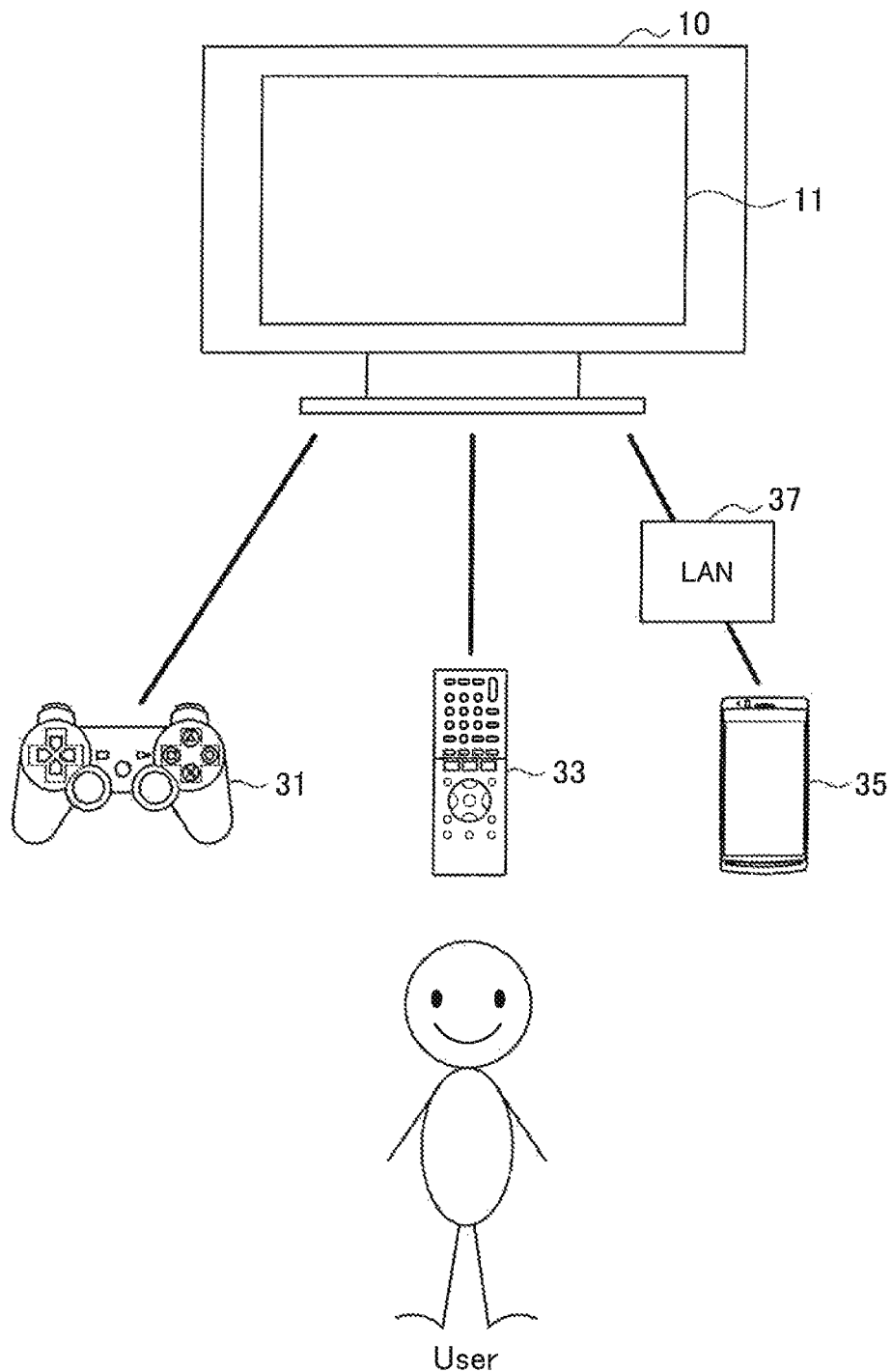
FIG. 1 is a diagram for illustrating an overview according to an embodiment of the present disclosure.

An explanation will be given of preferred embodiments of the present disclosure in detail below with reference to the accompanying drawings. Note that in the description and drawings, components having substantially the same functional structure are denoted by the same numerals to omit duplicate description.

The explanation is given in the following order.
1. One embodiment according to the present disclosure
1-1. Overview
1-2. Basic configuration
2. Operation process
2-1. Selection process for input terminal
2-2. Switching process for input terminal
3. Another embodiment
4. Conclusion The technology described herein according to the present disclosure may be implemented in various forms as is explained in the above items from "1. One embodiment according to the present disclosure" to "2. Operation process." Further, an input agent 20 executed in an information processing apparatus 10 according to an embodiment of the present disclosure includes:

(A) an acquisition unit (21) acquiring device information on a plurality of connected input terminals, and (B) a selection unit (25) determining an importance degree of the input terminal based on information concerning a detection unit of the input terminal included in the device information to select an input terminal to be used depending on the importance degree.

1. One Embodiment According to the Present Disclosure

[1-1. Overview]

FIG. 1 is a diagram for illustrating an overview according to an embodiment of the present disclosure. As shown in FIG. 1, an input system according to this embodiment includes an information processing apparatus 10, a plurality of connected input terminals connected with the information processing apparatus 10.

Each input terminal is connected with the information processing apparatus 10 directly or via a router, LAN (Local Area Network) and the like. Each input terminal and the information processing apparatus 10 may be connected with each other via a wireless or wired communication. In addition, each input terminal outputs to the information processing apparatus 10 information concerning a detection unit such as a tilt sensor, azimuth sensor, and photometer, and device information of itself such as remaining battery level.

In this embodiment, as for a plurality of input terminals connected with the information processing apparatus 10, for example, an input terminal 31 achieved with a game controller, input terminal 33 achieved with a remote controller, and input terminal 35 achieved with a mobile communication terminal representative of a smart phone are used as an example.

In addition, as shown in FIG. 1, the information processing apparatus 10 includes a display device 11. The information processing apparatus 10 is achieved with a home image display device, for example. Further, the information processing apparatus 10 according to this embodiment selects a proper input terminal based on the device information acquired from a plurality of connected input terminals. Then, the information processing apparatus 10 informs the user of a selected content such as by displaying a screen indicating the selected input terminal on the display device 11. Hereinabove, the overview of the information processing apparatus 10 according to an embodiment of the present disclosure has been described. Next, the problem in a standard input system is described.

(Standard Input System)

In recent years, as the input terminal is sophisticated, a plurality of input terminals of the same kind have been frequently connected to one input system. Moreover, a terminal equipped with various sensors as well as a communication function, including a smart phone that has recently become popular, has been increasingly connected as an input terminal to the information processing apparatus, which leads to increase in that a plurality of input terminals having the same kind of sensor are connected.

In this way, in the input system in which a plurality of input terminals of the same kind are connected to the information processing apparatus, in the case where the number of input terminals used for an application to be executed in the information processing apparatus is limited, the user has had to select a proper input terminal. In the input device sharing system described above in Patent Literature 1 also, the user has had to select a proper input terminal.

However, a kind and level of performance of the input terminal such as performance of a sensor provided to the input terminal has been difficult to grasp by appearance. In addition, selection has been typically carried out based on a simple rule under which an input terminal first detected by the information processing apparatus is used, and has been carried out independently of many kinds of performances and levels provided to the input terminal.

Therefore, with the above circumstance taken into point of view, the information processing apparatus 10 according to an embodiment of the present disclosure has arrived to be made. The information processing apparatus 10 according to an embodiment of the present disclosure has the input agent which selects a proper input terminal based on the device information acquired from a plurality of connected input terminals. This makes it possible to improve the accuracy of input terminal selection in the present disclosure.

Hereinafter, an explanation will be given of a basic configuration according to an embodiment of the present disclosure like this with reference to FIG. 2.

[1-2. Basic Configuration]

Figure 2:
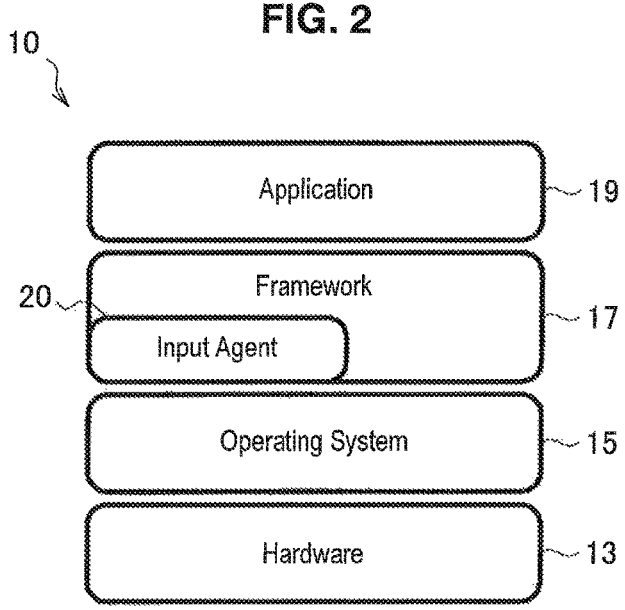
FIG. 2 is a diagram showing a configuration model of an information processing apparatus according to this embodiment.

FIG. 2 is a diagram showing a configuration model of the information processing apparatus 10 according to this embodiment. As shown in FIG. 2, a configuration of the information processing apparatus 10 includes a hardware 13, operating system 15, framework 17 and application 19.

The hardware (HW) 13 has a configuration including an input device, control device, storage device, output device, and communication device of the information processing apparatus 10. The input device accepts an operation input by the user and outputs a content thereof to the control device. The input device may have a physical configuration including a button, switch and the like.

The control device has functions of an arithmetic part and control part to control components of the information processing apparatus 10. The storage device stores programs, arithmetic parameters and the like used by the control device. This storage device may be a storage medium including, for example, a non-volatile memory such as a flash ROM (or flash memory), EEPROM (Electrically Erasable Programmable Read-Only Memory), and EPROM (Erasable Programmable ROM), a magnetic disk such as a hard disk and discoid magnetic disk, and an optical disk such as a CD (Compact Disc) and DVD-R (Digital Versatile Disc Recordable).

The output device includes the display device 11 shown in FIG. 1, a speaker and the like, for example. Moreover, the communication device is a module communicating with the input terminals. Specifically, the communication device includes a receiving part receiving the device information, input information and the like from the input terminal. In addition, the communication device includes a transmitting part transmitting the selected content and data to the input terminal.

The operating system (OS) 15 manages the HW 13 and provides basic functions used in many of the applications. Further, the OS 15 according to this embodiment exchanges data between the framework 17 and the HW 13.

The framework (FW) 17 provides general functions frequently required for many of the applications. In addition, the FW 17 according to this embodiment includes the input agent (IA) 20. The IA 20 has a function of selecting the input terminal to be used based on the device information acquired from a plurality of input terminals 30. Moreover, the IA 20 exchanges the data with the application 19 via the FW 17. Further, the IA 20 exchanges the data with the HW 13 and a plurality of connected input terminals 30 via the OS 15. A detailed configuration of the IA 20 will be described later.

The application (AP) 19 is software designed for a certain purpose such as document creation, numerical calculation, and game. Additionally, a sensor start request or sensor setting is performed at the time of startup depending on an application. Such a request is made to the input terminal via the FW 17. In this embodiment, the optimal input terminal for the application is selected based on such a sensor start request in the IA 20 included in the FW 17, however, the application side is not particularly aware of a selection process. Note that in this embodiment a game application using one tilt sensor is executed as an example of the AP 19.

(Functional Structure of IA 20)

Hereinabove, the information processing apparatus 10 according to this embodiment has been described. Next, an explanation will be given of the functions of the IA 20 included in the information processing apparatus 10 with reference to FIG. 3.

Figure 3:
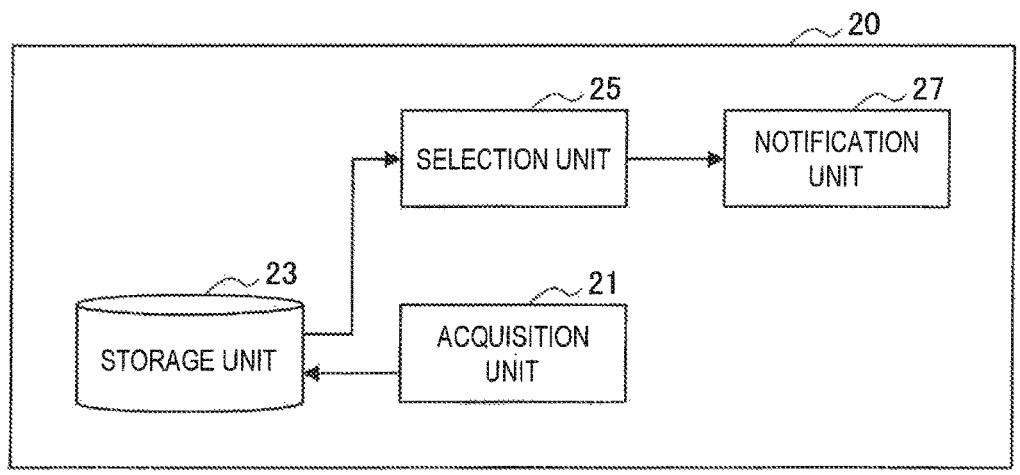
FIG. 3 is a block diagram showing a functional structure of an input agent according to this embodiment.

FIG. 3 is a block diagram showing a functional structure of the input agent 20 according to this embodiment. As shown in FIG. 3, the IA 20 includes an acquisition unit 21, storage unit 23, selection unit 25, and notification unit 27. Hereinafter, the respective components will be described.

The acquisition unit 21 acquires the device information from a plurality of connected input terminals. The device information is information including specification of the input terminal, terminal type, information concerning the detection unit included in the input terminal, remaining battery level, power consumption and the like.

The storage unit 23 has a function of storing the device information on the input terminals acquired by the acquisition unit 21. In addition, the storage unit 23 includes a detection unit management information database for managing the information for each kind of the detection units such as the tilt sensor, azimuth sensor, photometer, microphone, and camera based on the device information on the input terminals. FIG. 4 is a diagram showing an example of the detection unit management information. As shown in FIG. 4, as management information on the tilt sensor, for example, included are the device information (terminal type, sampling interval, remaining battery level, and accuracy), connection order, and usage history for each input terminal equipped with the tilt sensor. The connection order indicates the order in which the input terminal is connected to the information processing apparatus 10. The usage history indicates the number of times of being selected as the input terminal to be used.

The selection unit 25 determines the importance degree of the input terminal based on the information concerning the detection unit of the input terminal included in the device information to select the input terminal to be used depending on the importance degree. The importance degree of the input terminal may be a functional evaluation value for the input terminal, for example, a sum of the importance degrees each calculated for each detection unit included in the input terminal. Moreover, the selection unit 25 may switch the input terminal to be used depending on variation such as reduction in the remaining battery level of the selected input terminal. Note that the specific selection process is described in [2-1. Selection process for input terminal].

Further, the selection unit 25 may carry out switching to the input terminal able to input the information required for the AP 19. In a case where the AP 19 makes the request for the sensor start, setting or the like to the FW 17, the selection unit 25 can acquire what information the AP 19 to be executed requires via the FW 17. Note that the specific switching process will be described in [2-2. Switching process for input terminal].

The notification unit 27 notifies the user of the selected content of the selection unit 25. To be more specific, the notification unit 27 outputs the selected content to be notified from the display device 11 or speaker not shown which are included in the information processing apparatus 10. In addition, the notification unit 27 may allow the selected input terminal to carry out the screen display or sound output to notify the selected content. The notification like this by the notification unit 27 is described with reference to FIGS. 5 and 6.

Figure 5:
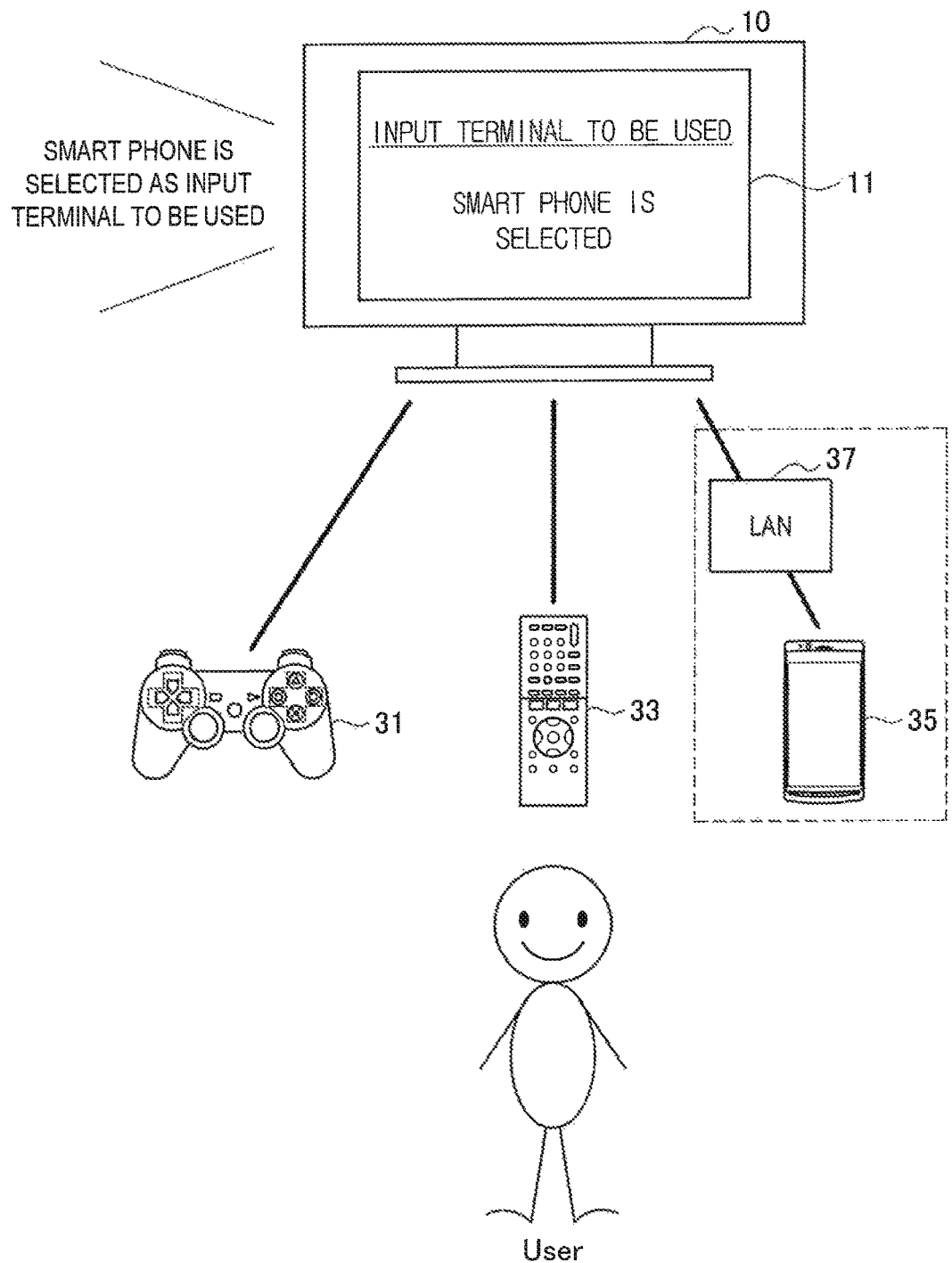
FIG. 5 is a diagram for illustrating an example of notifying through a screen display or voice output in the information processing apparatus according to this embodiment.

FIG. 5 is a diagram for illustrating an example of notifying through the screen display or voice output in the information processing apparatus 10. As shown in FIG. 5, if the input terminal 35 is selected as the input terminal to be used among the connected input terminals 31 to 35, the information processing apparatus 10 displays on the display device 11 "input terminal to be used/smart phone is selected". Alternatively, the information processing apparatus 10 outputs a voice from a speaker 12 "smart phone is selected as input terminal to be used."

Figure 6:
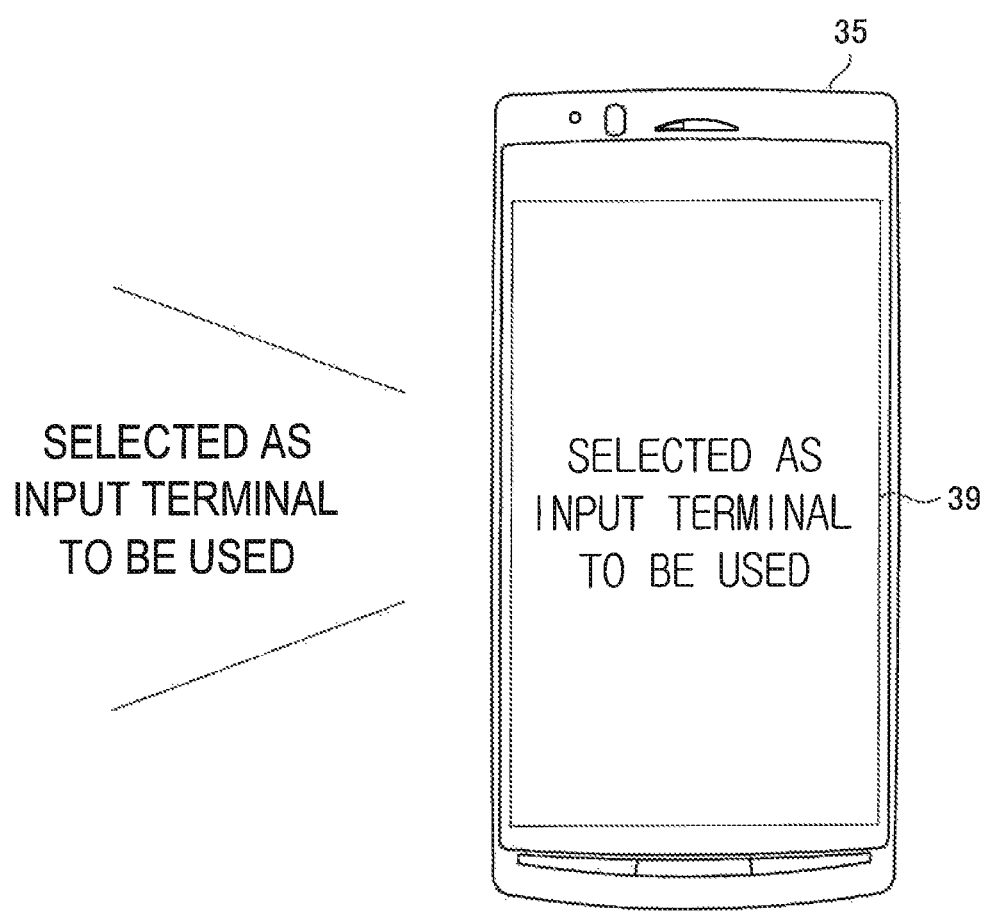
FIG. 6 is a diagram for illustrating an example of notifying through a screen display or voice output in an input terminal according to this embodiment.

FIG. 6 is a diagram for illustrating an example of notifying through the screen display or voice output in the input terminal 35. If the input terminal 35 is selected as the input terminal to be used, the notification unit 27 notifies the input terminal 35 of being selected. Then, the input terminal 35 displays, as shown in FIG. 6, on a display screen 39 "Selected as input terminal to be used." Alternatively, the input terminal 35 outputs a voice from the not shown speaker "Selected as input terminal to be used." Note that the notification unit 27 may allow the selected input terminal to notify using a notification sound, vibration, blink and the like.

The above described functions of the IA 20 are achieved with devices constituting the hardware (HW) 13.

Hereinabove, the basic configuration of the information processing apparatus 10 according to this embodiment has been described. Subsequently, an explanation will be given in detail of the operation process of the information processing apparatus 10 with specific examples being cited.

2. Operation Process

Figure 7:
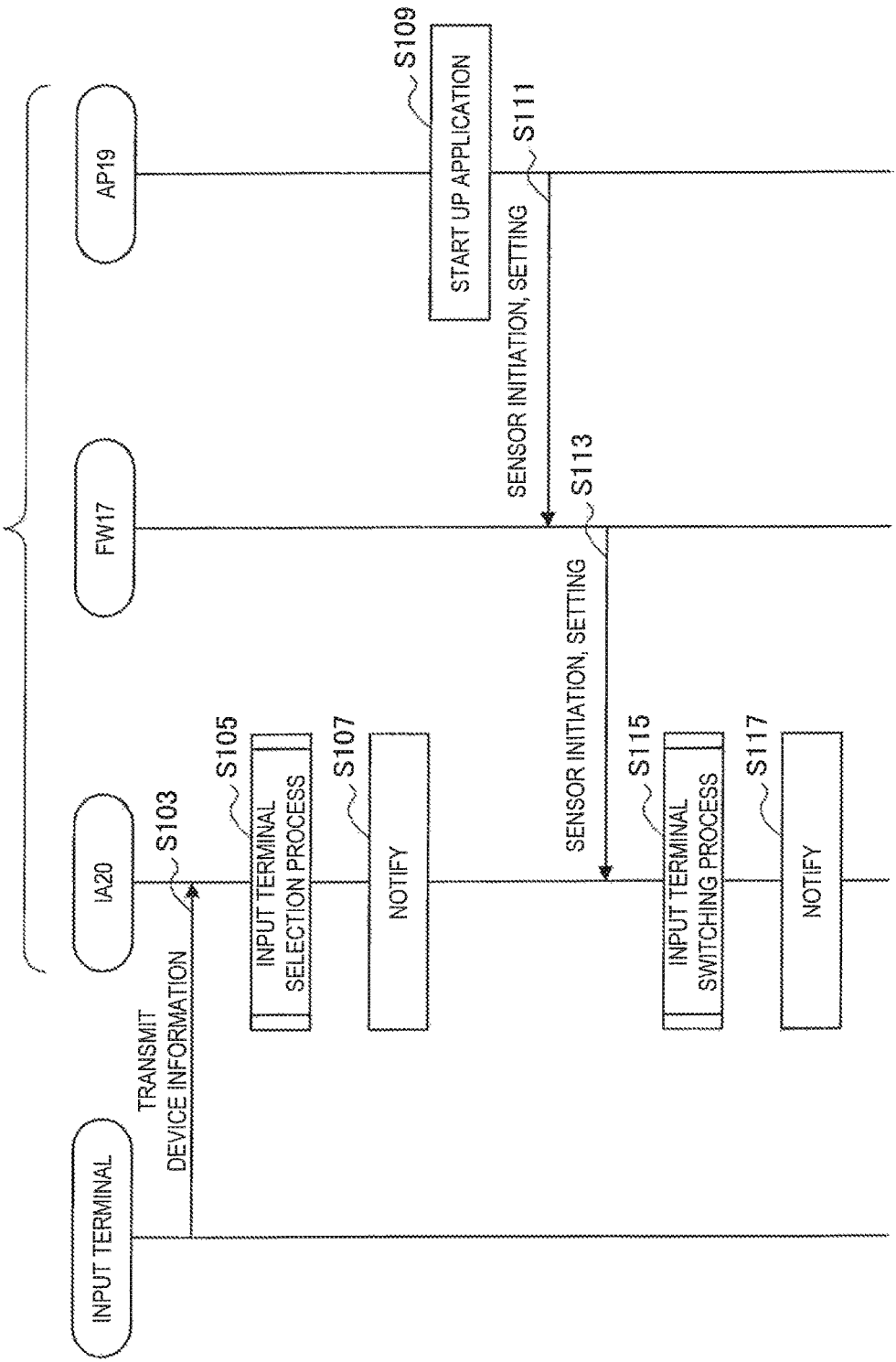
FIG. 7 is a flowchart showing an operation process of the information processing apparatus according to this embodiment.

FIG. 7 is a flowchart showing the operation process of the information processing apparatus 10 according to this embodiment. As shown in FIG. 7, first, at step S103 the input terminal connected to the information processing apparatus 10 transmits the device information to the information processing apparatus 10. Next, at S105 the IA 20 of the information processing apparatus 10 performs the selection process for the input terminal based on the acquired device information. The selection process for the input terminal by the IA 20 is described later.

Next, a step S107 the IA 20 notifies the user of information indicating the input terminal selected as an input terminal to be used.

On the other hand, if at step S109 the AP 19 is started up, at step S111 the AP 19 makes a required sensor start request. At this time, the AP 19 may make a request for setting the sampling interval, accuracy and the like required accompanied by the sensor start request.

Next, at step S113, the FW 17 having received the sensor start request from the AP 19 passes the request from the AP 19 to the IA 20. Subsequently, at step S115 the IA 20 determines whether or not the input terminal being used is the input terminal which is able to input information required for the AP 19 based on the request from the AP 19 and switches the input terminal if necessary. The switching process for the input terminal by the IA 20 is described in detail later.

Then, at step S117 the IA 20 notifies the user of the information indicating that the input terminal selected as the input terminal to be used has been switched.

Hereinabove, the operation process of the information processing apparatus 10 according to this embodiment has been described. Subsequently, an explanation will be given in detail of the input terminal selection process of step S105 above.

[2-1. Selection Process for Input Terminal]

The selection unit 25 in the IA 20 determines the importance degree of each input terminal based on the information concerning the detection unit of the input terminal included in the device information as described above, and selects the input terminal to be used depending on the importance degree. Here, the importance degree of the input terminal may be quantification of the functional evaluation for the input terminal, for example.

In this embodiment, the functional evaluation for the input terminal is quantified based on evaluation by one or more detection units which the input terminal holds. The input terminal holds one or more detection units and the kinds of the held detection units are various, and therefore, the selection unit 25 calculates the importance degrees for each detection unit the input terminal holds to obtain the evaluation value for the input terminal by summing up the degrees.

Note that the more frequently the detection unit is used in many applications, the detection unit for the importance degree may be considered to be the higher. Therefore, the selection unit 25 finds the importance degree for the detection unit from the product of "usage rate of detection unit" and "evaluation value for detection unit." This causes the "evaluation value for detection unit" of the detection unit having higher "usage rate of detection unit" to be highly evaluated.

As for the "usage rate of detection unit", used are the usage rate of the detection unit with respect to the total number of the published applications, the usage rate of detection unit with respect to the total number of sold (or downloaded) applications and the like. Additionally, in a system in which a certain application operates, the usage rate of the detection unit with respect to the total number of applications published in a certain market may be used. Note that the "usage rate of detection unit" is set in the IA 20 in advance.

The "evaluation value for detection unit" is found from the product of values calculated using an evaluation value computation formula defined for each evaluation item of the detection unit. The evaluation item of the detection unit differs depending on the kind of the detection unit (tilt sensor, azimuth sensor, photometer, microphone, camera and the like) and may include the following, for example.

Sampling interval
Accuracy
Range (minimum value, maximum value)
Power consumption
Resolution (in a case where the detection unit is a camera) and so on The evaluation value computation formula for each evaluation item is defined in a manner that 1 is taken as the base of the evaluation item and a computation formula is defined such that the evaluation value falls within a range from about 0.5 to about 1.5, for example. The selection unit 25 multiplies values of the evaluation items by each other to set the resultant as the "functional evaluation value for detection unit." Note that the evaluation value computation formula for each evaluation item is defined in the IA 20 in advance.

The quantification of the functional evaluation for the input terminal described hereinabove can be assembled into Formula 1 below.

$$\text{Functional evaluation for input terminal} = \{\text{sum of the following values for each detection unit the input terminal holds (usage rate of detection unit)} \times \text{(evaluation value for detection unit)}\} \quad \text{(Formula 1)}$$

Therefore, since the functional evaluation for the input terminal is determined to be higher as the calculated value thereof is larger, and determined to be lower as the calculated value thereof is smaller, the selection unit 25 compares the functional evaluations of a plurality of connected input terminals to select the input terminal having higher evaluation value. Additionally, the selection unit 25 selects the input terminal taking into account a requirement to be minimally satisfied by the input terminal such as the remaining battery level. Hereinabove, determination criteria in the selection process for the input terminal has been described. Next, next, an explanation will be given of the operation process of the IA 20 with reference to FIG. 8.

Figure 8:
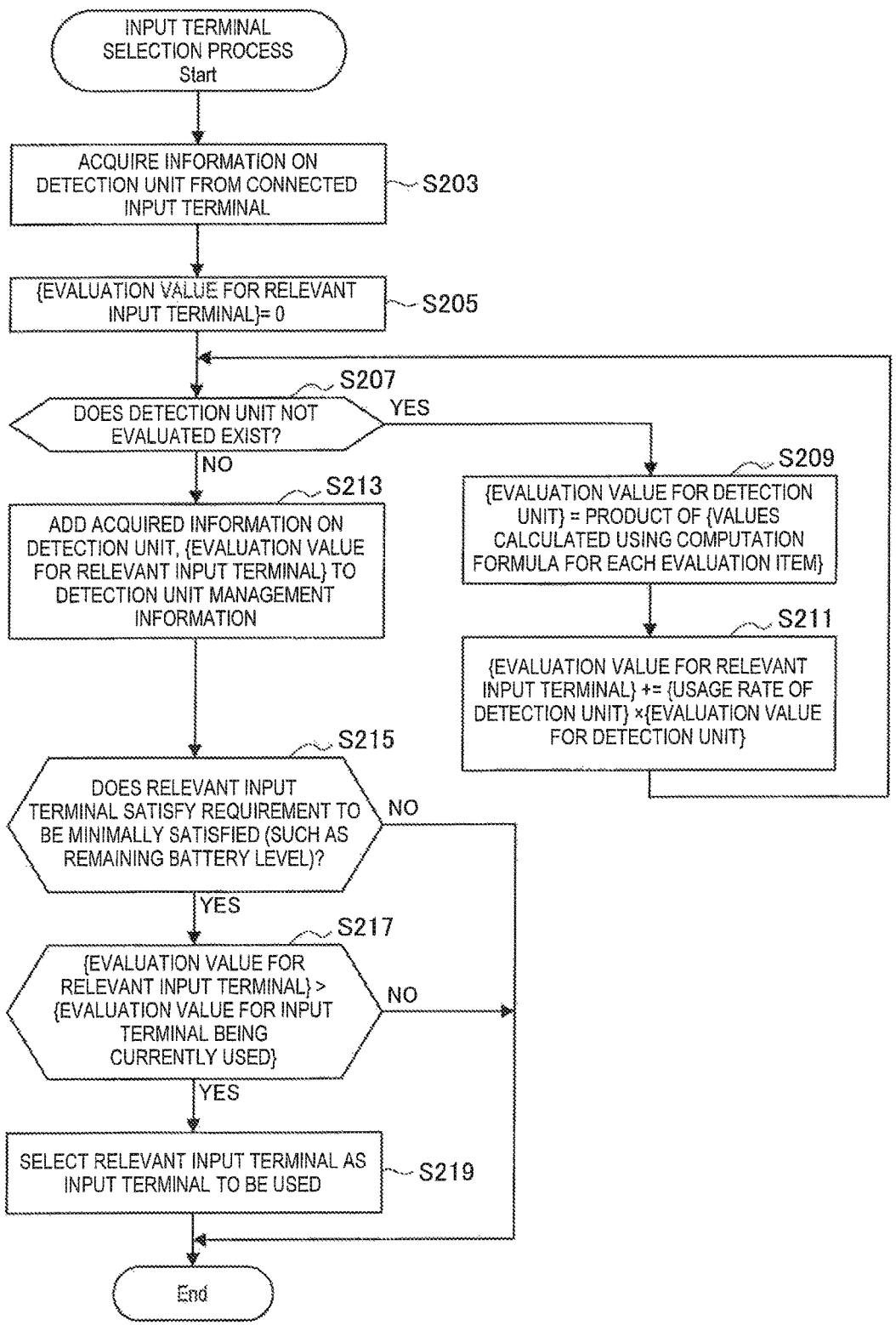
FIG. 8 is a flowchart showing an input terminal selection process of the IA according to this embodiment.

FIG. 8 is a flowchart showing the input terminal selection process of the IA 20 according to this embodiment. First, at step S203 the acquisition unit 21 acquires the device information including the information on the detection unit from the connected input terminal. In addition, the acquisition unit 21 stores the acquired device information in the storage unit 23.

Next, at step S205 the selection unit 25 starts to calculate the evaluation value for the input terminal from a state in which the evaluation value for the input terminal=0 based on the information on the acquired detection unit. Subsequently, at S209 the selection unit 25 calculates first the evaluation value for detection unit as to a detection unit not evaluated (S207/Yes) of the detection units included in the input terminal. The evaluation value for detection unit is a product of values calculated using the computation formula for each evaluation item.

Next, at step S211 the selection unit 25 multiples the above calculated evaluation value for detection unit by the usage rate of detection unit to find the evaluation value for the input terminal. The above S209 to S211 are repeated until all the detection units in the input terminal are respectively evaluated, and the evaluation value for the input terminal is incremented.

Next, at step S213 the selection unit 25 adds the calculated evaluation value for the input terminal to the detection unit management information stored in the storage unit 23. Subsequently, at step S215 the selection unit 25 determines based on the device information whether or not the input terminal in question satisfies the requirement to be minimally satisfied. The requirement to be minimally satisfied is, for example, that the remaining battery level is 10% or more and so on.

Next, at step S217 the selection unit 25 compares the evaluation value for the input terminal being currently used with the evaluation value for the input terminal in question. Then, in a case where the evaluation value for the input terminal in question is larger than the evaluation value for the input terminal being currently used, at step S219 the selection unit 25 selects the input terminal in question.

In this way, the selection unit 25 calculates the evaluation value for the input terminal based on the device information on the input terminals connected to the information processing apparatus 10 to carry out the selection of the input terminal. The selection process hereinabove described does not take in account information on the AP 19 executed in the information processing apparatus 10. Here, the selection unit 25 according to this embodiment may carry out switching to an input terminal proper for the AP 19 to be executed when the AP 19 is started up. Hereinafter, an explanation will be given of the switching process for the input terminal by the AP execution with reference to FIGS. 9 and 10.

[2-2. Switching Process for Input Terminal]

The switching of input terminal has a merit in that the optimal input terminal can be used depending on the situation, but if switching is frequently carried out, it may be troublesome for the user in some cases. Therefore, a switching determination process shown in FIG. 9 is first carried out at the time of startup of the AP.

Figure 9:
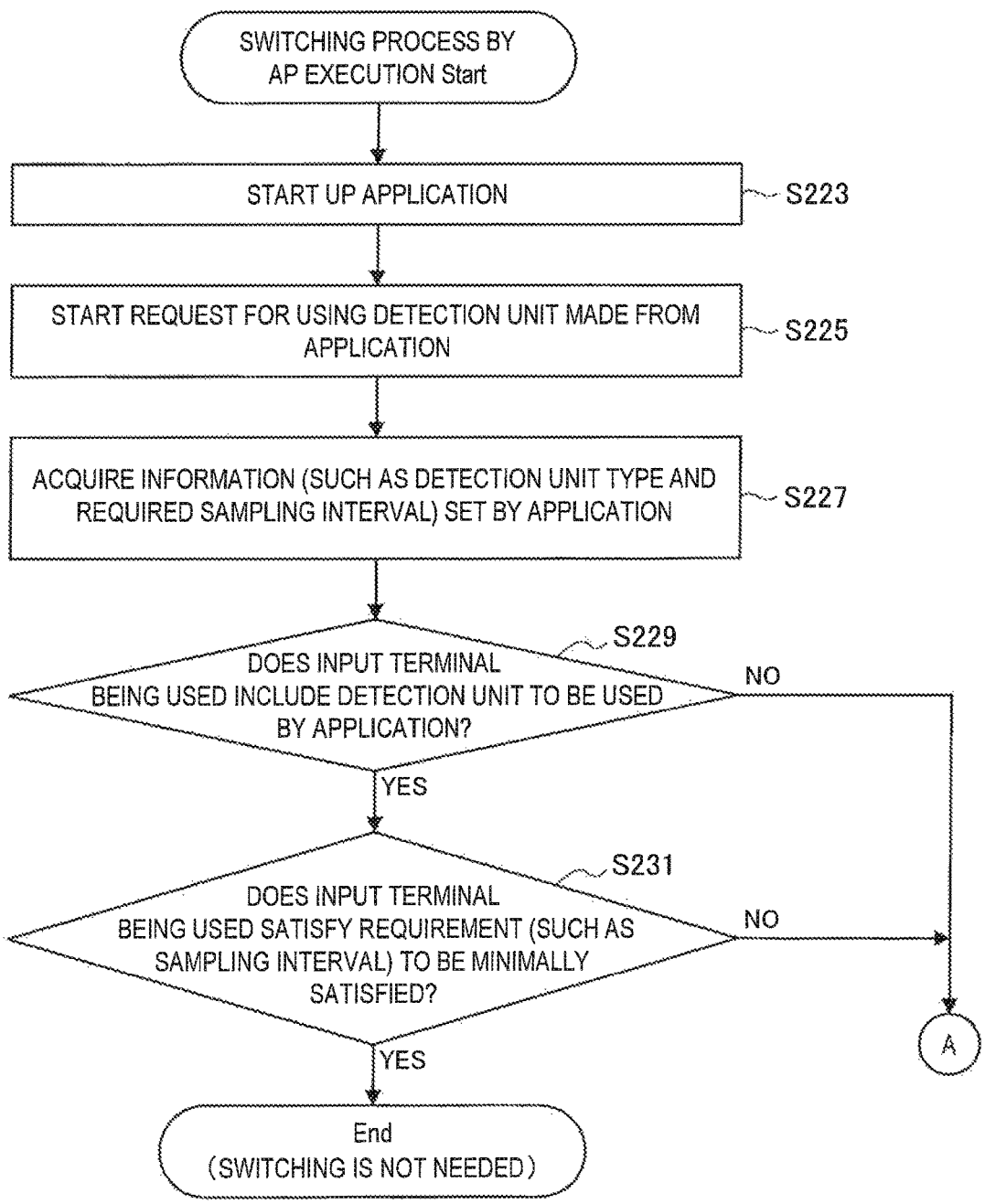
FIG. 9 is a flowchart showing a switching determination process according to this embodiment.

FIG. 9 is a flowchart showing the switching determination process. As shown in FIG. 9, first, when the application is started up at step S223, at S225 a start request for using the detection unit is made from the application. Next, at S227 the acquisition unit 21 acquires information set by the application. The information set by the application is information concerning the detection unit to be used by the application such as a detection unit type, and required sampling interval.

Next, at step S229 the selection unit 25 determines whether or not the input terminal being currently used includes the detection unit to be used by the application which has been started up. Subsequently, at step S231 the selection unit 25 determines whether or not the input terminal being currently used satisfies the requirement to be minimally satisfied in order for the application which has been started up to use. Here, examples are the sampling interval, range, and the like.

If at step S229 above, the detection unit to be used by the application is determined to be not included, or if at step S231 above, the requirement to be minimally satisfied as to the detection unit to be used by the application is not satisfied, switching is carried out. Subsequently, an explanation will be given of the switching process for the input terminal with reference to FIG. 10.

Figure 10:
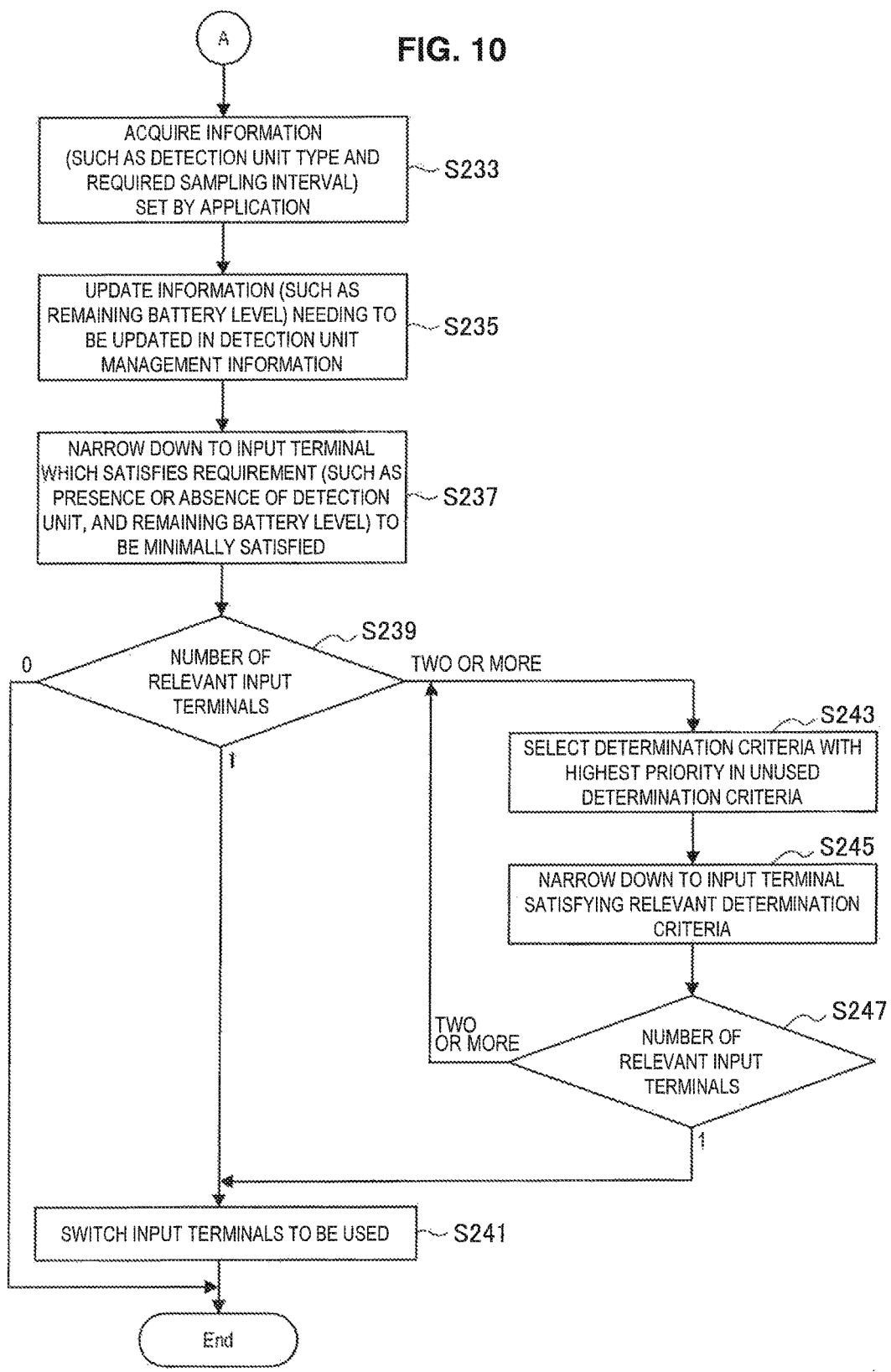
FIG. 10 is a flowchart showing a switching process according to this embodiment.

FIG. 10 is a flowchart showing the switching process for the input terminal according to this embodiment. At step S233 the acquisition unit 21 acquires the information set by the application, and then at S235 newly acquires information needed to be updated in the detection unit management information from input terminal to update the detection unit management information. The information needed to be updated includes the remaining battery level which varies with time and the like.

Next, at step S237 the selection unit 25 narrows a plurality of connected input terminals down to an input terminal which satisfies the requirement to be minimally satisfied as to the input terminal used for the application based on the detection unit management information. The requirement to be minimally satisfied as to the input terminal used for the application includes the presence or absence of the detection unit, remaining battery level and the like.

Next, at step S239 the selection unit 25 does not carry out the switching of input terminal if the number of the input terminals satisfying the requirement at step S237 is zero. In addition, if the number of the input terminals satisfying the requirement at step S237 is one, the selection unit 25 at S241 carries out the process switching that input terminal.

Further, if the number of the input terminals satisfying the requirement at step S237 is two or more, the switching process proceeds to S243. At step S243 the selection unit 25 selects the determination criteria with the highest priority in unused determination criteria, and at step S245 narrows down to the input terminal satisfying the relevant determination criteria.

Then, at step S247 the selection unit 25 repeats the process from S243 to S245 until the number of the relevant input terminals is one. When the number of the relevant input terminals is one, at step S241 the selection unit 25 carries out the process switching to the relevant input terminal.

There are various determination criteria at step S243 above. Hereinafter, an example of the determination criteria is cited. Note that the priorities of the determination criteria are defined in advance in the LA 20.

Connection order . . . the order of connection to the information processing apparatus 10 (for example, the input terminal previously/later connected is prioritized, and so on)

Terminal type . . . the priority is varied depending on the terminal type such as a remote controller, smart phone, or game controller.

Function (presence or absence of the detection unit) . . . in a case where the application uses a plurality of functions (detection units), the input terminal having more or all of functions (detection units) is prioritized.

Performance . . . accuracy, sampling interval, maximum or minimum value (range) and so on Power consumption . . . the input terminal with lower rate of power consumption is prioritized.

Remaining battery level . . . the remaining battery level is 50% or more in a battery-powered input terminal such as a smart phone and so on.

Usage history in the past . . . the input terminal having history of usage setting by the user in the past or the input terminal having being practically used is prioritized.

User setting . . . the input terminal having usage setting by the user is prioritized.

Performance difference . . . in a case where a plurality of detection units of the same kind are used at the same time (such as multi-player game), the input terminal having the detection units with an equivalent performance is prioritized.

Figure 11:
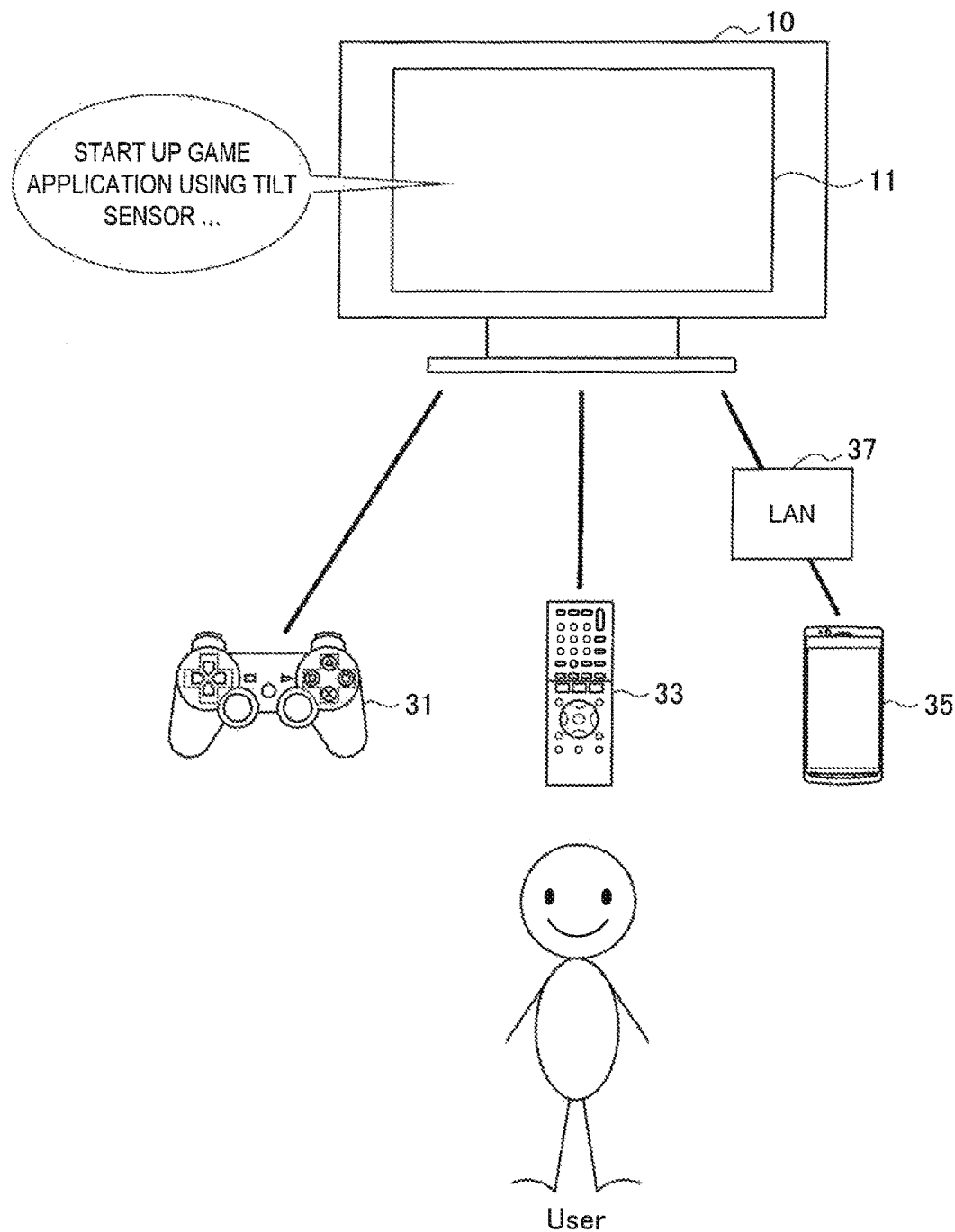
FIG. 11 is an overall view for illustrating the switching process with a specific example according to this embodiment.

The switching process for the input terminal described hereinabove will be explained with specific examples being cited. In the specific examples described here, as shown in an overall view in FIG. 11, connected to the information processing apparatus 10 are an input terminal 31 (game controller), input terminal 33 (remote controller), input terminal 35 (smart phone A), and input terminal 36 (smart phone B).

Then, a game application using the tilt sensor is started up in the information processing apparatus 10. Therefore, since the application at S233 above sets a "tilt sensor" as a type of the detection unit to be used, the selection unit 25 refers to the management information of the tilt sensor shown in FIG. 4. In addition, in a case where the requirement to be minimally satisfied as to the input terminal used for the application at S237 above is the "remaining battery level is 10% or more", the relevant input terminal is narrowed down to three of the remote controller, smart phone A and smart phone B.

Moreover, in a case where the "determination criteria with the highest priority in unused determination criteria" at S243 above is the sampling interval of 40 msecs or less, the relevant input terminal is narrowed down to two of the smart phone A and smart phone B. Since there exist two or more relevant input terminals, the switching process returns to S243.

Subsequently, in a case where the "determination criteria with the highest priority in unused determination criteria" at S243 above is the accuracy, the accuracies of the smart phone A and the smart phone B are the same, and thus the number of the relevant input terminals remains two. Since there exist two or more relevant input terminals, the switching process returns to S243.

Next, in a case where the "determination criteria with the highest priority in unused determination criteria" at S243 above is the connection order, connection order "3" of the smart phone A>connection order "4" of the smart phone B, and thus the smart phone A is prioritized. This leads to that the relevant input terminal is one at S247, the selection unit 25 switches the input terminal to be used at S241.

Note that the selection unit 25 may carry out again the switching process as shown in FIG. 10 depending on a state variation of the selected input terminal. The state variation includes reduction in the remaining battery level, mode switching (such as switching of an ON/OFF switch of the detection unit), physical breakage, communication disconnection with the information processing apparatus 10 and the like. Further, in a case where a new input terminal is connected, the switching process as shown in FIG. 10 may be carried out again to switch to the more optimal input terminal.

For example, in a case where the selected smart phone A varies in the state thereof to become unusable as the input terminal, the selection unit 25 carries out again the switching process shown in FIG. 10 to switch to the optimal input terminal. Here, the case of becoming unusable as the input terminal includes cases where the remaining battery level the smart phone A becomes 10% or lower, an operation switching to another mode is made in the smart phone A, a communication with the information processing apparatus 10 is disconnected, and the like.

As described above, according to an embodiment of the present invention, the IA 20 selects the optimal input terminal with taking into account the various functions of the input terminals, allowing the multi-functional and high-functional input terminal to be used more efficiently. Further, according to this embodiment, the selection can be made depending on the information such as the performance of the detection unit and remaining battery level which is difficult for the user to determine by appearance. Additionally, when the application is started up, the IA 20 can switch to the optimal input terminal for the application. In this way, the optimal input terminal is selected by the IA 20, reducing a burden on the user of selecting by himself/herself. Note that if the user specifies the input terminal to be used, the IA 20 may select/switch to the input terminal specified in priority to other requirements.

3. Another Embodiment

In an embodiment of the present disclosure described above, the input terminal is selected before the AP 19 is started up, and at the time of startup or the AP 19, if the switching is determined to be required, the switching process is carried out. However, as another embodiment of the present disclosure, the IA 20 can be also proposed in which the input terminal is selected using the startup of the AP 19 as a trigger.

The input agent 20 executed in the information processing apparatus 10 according to another embodiment of the present disclosure includes:

(A) an acquisition unit (21) acquiring device information on a plurality of connected input terminals, and (B) a selection unit (25) selecting an input terminal which can input information that an application to be executed requires, as an input terminal to be used based on the device info illation.

The IA 20 having the above configuration according to another embodiment of the present disclosure can select the optimal input terminal for the application to be executed based on the device information acquired from a plurality of connected input terminals. This makes it possible to improve the accuracy of input terminal selection in the present disclosure.

4. Conclusion

As described above, according to this embodiment, the optimal input terminal is selected with taking into account the various functions of the input terminals, allowing the multi-functional and high-functional input terminal to be used more efficiently. Further, a burden of selecting the optimal input terminal by the user himself/herself can be reduced.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

Additionally, a computer program can also be created which is to exert the functions equivalent to the components of the information processing apparatus 10 according to the above described embodiment. Moreover, a storage medium can be provided which has the computer program stored therein. The storage medium includes, for example, a magnetic disk, optical disk, magneto-optical disk, flash memory and the like. Further, the computer program above may be distributed, for example, via a network without using the storage medium.

Additionally, the present technology may also be configured as below.

(1)

An information processing apparatus including:

an acquisition unit configured to acquire device information on a plurality of connected input terminals; and a selection unit configured to determine an importance degree of the input terminals based on information concerning detection units of the input terminals included in the device information to select the input terminal to be used depending on the importance degree.

(2)

The information processing apparatus according to (1), wherein the importance degree of the input terminals is a sum of importance degrees calculated for each detection unit of the input terminals.

(3)

The information processing apparatus according to (1) or (2), wherein the selection unit selects, of the input terminals satisfying a predetermined condition in a remaining battery level included in the device information, the input terminal with highest importance degree as the input terminal to be used.

(4)

The information processing apparatus according to any one of (1) to (3), including:

a notification unit configured to notify a user of information indicating the input terminal selected by the selection unit.

(5)

The information processing apparatus according to (4), wherein the notification unit notifies the user of the selected input terminal using a screen display.

(6)

The information processing apparatus according to (4) or (5), wherein the notification unit notifies the user of the selected input terminal using a sound.

(7)

The information processing apparatus according to any one of (1) to (6), wherein the selection unit determines whether or not the input terminal selected as the input terminal to be used is the input terminal which is able to input information required for an application to be executed, and switches the input terminals to be used depending on a determination result.

(8)

The information processing apparatus according to (7), wherein in a case where a user acquires a history information that the user selected in a past time the input terminal used for the application to be executed, the selection unit switches the input terminals to be used based on the history information.

(9)

The information processing apparatus according to any one of (1) to (8), wherein the selection unit switches the input terminals to be used in response to a switching operation by a user.

(10)

The information processing apparatus according to any one of (1) to (9), wherein in a case where a mode switching operation is made by the user in the input terminal being used, the selection unit switches the input terminals to be used.

(11)

The information processing apparatus according to any one of (1) to (10), wherein the selection unit sets a rule for switching the input terminals to switch the input terminals to be used based on the rule.

(12)

An input terminal selection method including:

a step for acquiring device information on a plurality of connected input terminals; and a step for determining an importance degree of the input terminals based on information concerning detection units of the input terminals included in the device information to select the input terminal to be used depending on the importance degree.

(13)

A program for causing a computer to execute processes of:

acquiring device information on a plurality of connected input terminals; and determining an importance degree of the input terminals based on information concerning detection units of the input terminals included in the device information to select the input terminal to be used depending on the importance degree.

(14)

A system including:

a plurality of input terminals each including a transmitting part configured to transmit device information of each of the input terminals;

an acquisition unit configured to acquire device information on the plurality of connected input terminals; and a selection unit configured to determine an importance degree of the input terminals based on information concerning detection units of the input terminals included in the device information to select the input terminal to be used depending on the importance degree.

(15)

An information processing apparatus including:

an acquisition unit configured to acquire device information on a plurality of connected input terminals; and a selection unit configured to select the input terminal which is able to input information required for an application to be executed, as the input terminal to be used, based on the device information.

REFERENCE SIGNS LIST

10 information processing apparatus
11 display device
13 HW
15 OS
17 FW
19 AP
20 IA
21 acquisition unit
23 storage unit
25 selection unit
27 notification unit

The invention claimed is:

1. An information processing apparatus comprising:
an acquisition unit configured to acquire device information on a plurality of connected input terminals; and
a selection unit configured to select, from the plurality of connected input terminals, an input terminal to be used based on information concerning one or more detection units of each input terminal of the plurality of connected input terminals that is included in the device information,
wherein the device information includes information regarding remaining battery level of each one of the plurality of connected input terminals,
wherein an importance degree of each input terminal is calculated by quantifying a functional evaluation of the input terminal based on a usage rate of each detection unit of the input terminal, wherein the selection unit selects, from among those of the connected input terminals having a remaining battery level that satisfies a predetermined condition, the input terminal with the highest importance degree as the input terminal to be used, and wherein the acquisition unit and the selection unit are each implemented via at least one processor.

2. The information processing apparatus according to claim 1, comprising:
a notification unit configured to notify a user of information indicating the input terminal selected by the selection unit.

3. The information processing apparatus according to claim 2, wherein the notification unit notifies the user of the selected input terminal using a screen display.

4. The information processing apparatus according to claim 2, wherein the notification unit notifies the user of the selected input terminal using a sound.

5. The information processing apparatus according to claim 1, wherein the selection unit determines whether or not the input terminal selected as the input terminal to be used is the input terminal which is able to input information required for an application to be executed, and switches the input terminals to be used depending on a determination result.

6. The information processing apparatus according to claim 5, wherein in a case where a user acquires a history information that the user selected in a past time the input terminal used for the application to be executed, the selection unit switches the input terminals to be used based on the history information.

7. The information processing apparatus according to claim 1, wherein the selection unit switches the input terminals to be used in response to a switching operation by a user.

8. The information processing apparatus according to claim 1, wherein in a case where a mode switching operation is made by the user in the input terminal being used, the selection unit switches the input terminals to be used.

9. The information processing apparatus according to claim 1, wherein the selection unit sets a rule for switching the input terminals to switch the input terminals to be used based on the rule.

10. The information processing apparatus according to claim 1,
wherein the importance degrees are determined based on the information concerning the detection units that is included in the device information.

11. The information processing apparatus according to claim 10, wherein the importance degree of the input terminals is a respective sum of functional evaluations calculated for each detection unit of the input terminals.

12. The information processing apparatus according to claim 10, wherein the importance degrees are determined as respectively assigned values.

13. The information processing apparatus according to claim 12, wherein the input terminal having a highest assigned value of importance degree is selected as the input terminal to be used.

14. The information processing apparatus according to claim 1,
wherein the importance degree of each input terminal is calculated by quantifying the functional evaluation of the input terminal based on one or more evaluation items for each detection unit of the input terminal, and wherein the evaluation items are determined from among a sampling interval, an accuracy, a range, a power consumption, and a resolution of the detection unit.

15. The information processing apparatus according to claim 14,
wherein the evaluation items used to calculate the importance degree are selected based on a kind of detection unit.

16. An input terminal selection method comprising:
acquiring device information on a plurality of connected input terminals; and
selecting, from the plurality of connected input terminals, an input terminal to be used based on information concerning one or more detection units of each input terminal of the plurality of connected input terminals that is included in the device information,
wherein the device information includes information regarding remaining battery level of each one of the plurality of connected input terminals,
wherein an importance degree of each input terminal is calculated by quantifying a functional evaluation of the input terminal based on a usage rate of each detection unit of the input terminal, and
wherein the input terminal to be used is selected, from among those of the connected input terminals having a remaining battery level that satisfies a predetermined condition, as the input terminal with the highest importance degree.

17. A non-transitory computer-readable medium having embodied there a program, which when executed by a computer causes the computer to execute a method, the method comprising:
acquiring device information on a plurality of connected input terminals; and
selecting, from the plurality of connected input terminals, an input terminal to be used based on information concerning one or more detection units of each input terminal of the plurality of connected input terminals that is included in the device information,
wherein the device information includes information regarding remaining battery level of each one of the plurality of connected input terminals,
wherein an importance degree of each input terminal is calculated by quantifying a functional evaluation of the input terminal based on a usage rate of each detection unit of the input terminal, and
wherein the input terminal to be used is selected, from among those of the connected input terminals having a remaining battery level that satisfies a predetermined condition, as the input terminal with the highest importance degree.

18. A system comprising:
a plurality of input terminals each including a transmitting part configured to transmit device information of each of the input terminals;
an acquisition unit configured to acquire device information on the plurality of connected input terminals; and
a selection unit configured to select, from the plurality of connected input terminals, an input terminal to be used based on information concerning one or more detection units of each input terminal of the plurality of connected input terminals that is included in the device information,
wherein the device information includes information regarding remaining battery level of a respective one of the plurality of input terminals, wherein an importance degree of each input terminal is calculated by quantifying a functional evaluation of the input terminal based on a usage rate of each detection unit of the input terminal, wherein the input terminal to be used is selected, from among those of the input terminals having a remaining battery level that satisfies a predetermined condition, as the input terminal with the highest importance degree, and wherein the acquisition unit and the selection unit are each implemented via at least one processor.

* * * * *